United States Patent
Kimura et al.

(10) Patent No.: US 6,563,099 B2
(45) Date of Patent: May 13, 2003

(54) OPTICAL INFORMATION RECORDING/ REPRODUCING APPARATUS, AND OPTICAL HEAD APPARATUS

(75) Inventors: Shigeharu Kimura, Tokyo (JP); Takeshi Shimano, Tokorozawa (JP); Tetsuo Ariyoshi, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/925,311

(22) Filed: Aug. 10, 2001

(65) Prior Publication Data

US 2002/0070328 A1 Jun. 13, 2002

(30) Foreign Application Priority Data

Dec. 7, 2000 (JP) ........................................ 2000-373114

(51) Int. Cl.$^7$ ............................................... G02B 27/40
(52) U.S. Cl. ............................... 250/201.5; 369/44.23; 369/53.28
(58) Field of Search ...................... 250/201.5, 208.1, 250/237 G, 201.2, 201.3; 369/44.23, 44.25, 44.32, 44.37, 44.38, 44.39, 47.1, 53.28, 112.05, 112.12, 112.16, 121

(56) References Cited

U.S. PATENT DOCUMENTS

| | | | | |
|---|---|---|---|---|
| 5,128,914 A | * | 7/1992 | Kurata et al. | 369/44.37 |
| 5,986,996 A | * | 11/1999 | Kitamura et al. | 369/112.12 |
| 6,208,596 B1 | * | 3/2001 | Imai et al. | 369/44.23 |

* cited by examiner

*Primary Examiner*—Kevin Pyo
*Assistant Examiner*—Seung C. Sohn

(57) ABSTRACT

To reduce an effect of reflected light from a layer (or layers) other than a layer to be read upon focus position control when reading a multilayer optical disk in an optical disk drive. In an optical system where a focus error signal is generated by the knife edge method, a photodetector 53 that is divided into four parts is used. Each of two pairs of light detecting elements on the right or left side are formed by division of a detection plane of the photodetector such that the reflected light from a neighboring layer falls half-and-half on that pair of the light detecting elements. Signals from the photodetector are given with alternating polarities in such a way that any adjacent light detecting elements have mutually different polarities and are added up together to form the focus error signal.

2 Claims, 13 Drawing Sheets

OPTICAL INFORMATION RECORDING/REPRODUCING APPARATUS, AND OPTICAL HEAD APPARATUS

BACKGROUND OF THE INVENTION

1. Field of the Invention

The present invention relates to an optical information recording/reproducing apparatus, specifically to a reading optical system of an optical disk drive.

2. Description of the Related Art

FIG. 2 is a schematic drawing of a normal optical system of the optical disk drive. Laser light emitted from a semiconductor laser 1 becomes a collimated beam circular in cross section by a collimator 23 and a prism 2. Subsequently, the laser light is reflected by a polarizing beam splitter 31 and converted to circularly-polarized light by a quarter-wave plate 21. This circularly-polarized light is converged on an optical disk 50 by an objective lens 41. The optical disk 50 has a guiding trench in the interior of the disk 50 and a recorded mark whose reflectivity is different from that of a region without recording mark has been written. The length of the recording mark and the spacing therebetween are encoded according to information to be recorded. Since the optical disk 50 is rotating, the recording mark comes in and comes out of an irradiation position of the laser light and the quantity of reflected light varies with time.

The reflected light carrying information returns to the objective lens 41, and is converted from the circularly-polarized light to linearly-polarized light by the quarter-wave plate 21. Since this direction of polarization is orthogonal to a direction of polarization of the emitted light from the semiconductor laser 1, the light is transmitted by the polarizing beam splitter 31. This transmitted light is divided into two light beams by a beam splitter 32. The transmitted light of the beam splitter 32 is blocked into a half by a knife edge 22 and converged onto a split photodetector (a two-part split photodetector) 51 located at a focus position of a converging lens 42 by the converging lens 42.

When the optical disk 50 deviates in the direction of the optical axis and the focus of the irradiation light is not exactly on a layer bearing the recording marks thereon, the quantities of beams of the light falling on two light detecting elements of the split photodetector 51 become unbalanced. This unbalance is detected by an electronic circuit 60 as a differential signal, which is made to act as a focus error signal 71. The position of the objective lens 41 is adjusted by a lens actuator 63 using this focus error signal 71 so that the focus position of the emitted light of the objective light 41 is always on the layer bearing the recording marks, to avoid an out-of-focus state. On the other hand, the light reflected by the beam splitter 32 irradiates a split photodetector (a two-part split photodetector) 52 through the converging lens 43 with the light being out of focus to the photodetector 52. An electronic circuit 61 acts as a differential circuit, and an output therefrom becomes a tracking error signal 72. Moreover, the signals added up together by an electronic circuit 62 become a data signal 73.

In the conventional example of the optical disk drive described above, detection of the focus error signal is achieved by the knife edge method, and the tracking error signal is detected by a method called the diffracted light differential system. In addition to these, various methods have been proposed, and there are the astigmatic method, the image rotation method, etc. as typical detection methods of the focus error signal. Regarding detection methods of the tracking signal, there are the triplet-spot method, the wobbling method, and the phase difference method, etc. These methods have drawbacks as well as advantages with respect to optical alignment or efficiency of light, and hence are used properly according to the kind of drives. For these details, a book entitled, "Basis and applications of optical disk storage," (supervised by Yoshito Tsunoda, edited by a corporate juridical person, Institute of Electronics, Information and Communication Engineers) gives detailed explanation.

At the moment when large-capacity and high-speed data transmission is being made to be possible, the optical disk as an information storage medium needs to be a high-density medium to record large-capacity data of moving picture information etc. To fulfill this task, there is no way except shortening the spacing of the recording marks and the track pitch of the optical information medium. Then, in order to read and write the optical information medium with a small spacing of the recording marks and the track pitch, a minute laser spot is prerequisite, and with this view the laser spot is being made minute down to a size comparable to a wavelength of the laser light with the use of an objective lens having a large numerical aperture (NA). However, there is a lower bound to the spot size that is governed by the diffraction limit, so it cannot be miniaturized interminably. Accordingly, the in-plane recording density that nominally depends on the size of the recording mark or the track pitch has a limit that is governed by a lower bound of the spot size. Then, it has been thought to try to increase the information density per unit area of the optical disk by adopting a layer configuration composed of more than one optical information recording layers.

When information is read from the multilayer optical disk, however, there occurs a crosstalk between the signals of the respective layers and a large error may be generated in the read signal with the conventional type optical head. One of reasons for such malfunction is that the focus position of the laser light deviates away from an optical information medium layer that is intended to be read.

The technology that eliminates interference in the focus error signal is disclosed by JP-A-222867/1998 entitled "Optical Pick-Up Apparatus." This technology is to provide auxiliary light-receiving regions having small areas on both sides of the split photodetector. This technology stands on a basic idea that a spread of the focus error signal for a single layer is narrowed, but an incident state of the reflected light from a neighboring optical information medium layer on the photodetector is not considered. Therefore, it is necessary to correct electrically the quantities of the signals from the auxiliary light-receiving regions to generate the focus error signal.

SUMMARY OF THE INVENTION

The present invention aims at reducing the crosstalk of the focus error signal originated from the neighboring optical information medium layer in a read optical system of the optical disk drive for reading the multilayer optical disk.

FIG. 3 is a schematic diagram for illustrating the problem of the focus error signal generated from the multilayer disk. FIG. 3 shows a schematic cross section of a two-layer optical disk 501 having a first optical information medium layer 511 and a second optical information medium layer 512 therein. Irradiation light 80 from a semiconductor laser (not shown in the figure) is converged by the objective lens 41 and is in focus to the first optical information medium layer 511. Reflected light therefrom is transmitted through the objective lens 41 to become a collimated beam and a part of the collimated beam is blocked by the knife edge 22 on the way. The other part of the light that avoids being blocked by the knife edge 22 falls on the split photodetector 51 through the converging lens 43, as being in a state 81.

As shown in FIG. 4, the reflected light 81 from the first optical information medium layer 511 is converged to be a small spot on a split position of the split photodetector 51. In this state, the same quantity of light falls on each of the light detecting elements of the split photodetector 51, respectively. Since the focus error signal is obtained as a differential signal of the split photodetector, if the light beam is in focus to the optical information medium layer, the focus error signal becomes zero because of a zero differential signal. In the case of a single-layer optical disk having no neighboring layer, the objective lens can be controlled by a servomechanism on the basis of this signal in order that the focus position becomes optimal. However, if there is the neighboring layer, the reflected light by the neighboring layer affects the focus error signal adversely. The reason will be described as follows.

Since the optical disk 501 has a structure of the multilayer, the laser light 82 having passed through the first optical information medium layer 511 also irradiates the second optical information medium layer 512 while the laser light 82 is out of focus, as shown in FIG. 3. Reflected light 83 from the second optical information medium layer 512 after passing through the objective lens 41 becomes not a collimated beam but a converging beam. A position at which a beam size of the reflected light 84 becomes minimum after passing through a converging lens 43 gets closer to the converging lens 43, and comes into a state of being extended on a detection plane of the split photodetector 51. FIG. 5 shows an irradiation state of the reflected light 84 from the second information medium layer 512, on the split photodetector 51. The reflected light 84 falls on only one of the light detecting elements of the split photodetector 51.

In the foregoing, the reflected light from the first optical information medium layer 511 and that from the second optical information medium layer 512 are described separately with respect to the incidence state to the split photodetector 51, but practically these beams of the reflected light fall on the split photodetector 51 simultaneously. Therefore, although the light is in focus to the first optical information medium layer 511, the differential signal from the split photodetector 51 becomes a non-zero value, overall light signals being unbalanced. If the objective lens 41 gets cornrolled by a servomechanism in this state, the optical disk deviates from the focus position. This phenomenon also occurs in the case where the second optical information medium layer is located on the objective lens 41 side of the first optical information medium layer, the optical outputs become unbalanced in a direction opposite to the above case.

FIG. 6 shows the differential signal (focus error signal) when the optical disk 501 is being moved away from the objective lens 41. The horizontal axis of FIG. 6 indicates the focus position of the objective lens 41. In the figure, a point 74 and a point 75 roughly indicates positions of the second and first optical information medium layers 512, 511, respectively, and positions at which the differential signal becomes zero do not agree with the positions of the medium layers 74 and 75. An object of the present invention is to reduce the effect of the reflected light from the other medium layer that appears in the focus error signal, in consideration of the problem when reading the multilayer optical disk.

In this invention, a part of the photodetector on which the reflected light from the neighboring layer falls is divided into light detecting elements and a difference of the signals from the photodetector thus divided are taken to be canceled out, whereby the effect of the reflected light from the neighboring layer is avoided.

An optical information recording apparatus of the present invention records information by irradiating the optical disk having plurality of optical information medium layers therein with light, wherein it comprises:

a light source;

light irradiation means for converging the light from the light source and irradiating the optical disk therewith;

light converging means for extracting a part of returned light from the optical disk that passes a predetermined spatial region and converging it; and a photodetector for detecting the returned light from the optical disk that is converged by the light converging means. The photodetector further comprises:

first and second light detecting elements arranged such that, when one of the optical information medium layers of the optical disk is irradiated by the light irradiation means with the focus position of the light irradiation means being thereon, outputs of the first and second light detecting elements caused by the returned light from the one optical information medium layer are approximately equal to each other;

a third light detecting element arranged such that its output caused by the returned light from an optical information medium layer other than the one optical information medium layer is approximately equal to that of the first light detecting element; and a fourth light detecting element arranged such that its output caused by the returned light from an optical information medium layer other than the one optical information medium layer is approximately equal to that of the second light detecting element.

An optical information reproducing apparatus of the present invention reproduces information from the optical disk having the first and second optical information medium layers therein, wherein it comprises:

a light source;

light irradiation means for converging the light from the light source and irradiating the optical disk therewith;

light converging means for extracting a part of the returned light from the optical disk that passes a predetermined spatial region and converging it; and a photodetector for detecting the returned light from the optical disk that is converged by the light converging means.

The photodetector further comprises:

first and second light detecting elements arranged such that, when either of the first or second optical information medium layer of the optical disk is irradiated by the light irradiation means with the focus position of the light irradiation means being thereon, outputs of the first and second light detecting elements caused by the returned light from the one optical information medium layer are approximately equal to each other;

a third light detecting element arranged such that, when the first optical information medium layer of the optical disk is irradiated by the light irradiation means with the focus position of the light irradiation means being thereon, its output caused by the returned light from the second optical information medium layer is approximately equal to that of the first light detecting element; and a fourth light detecting element arranged such that, when the second optical information medium layer of the optical disk is irradiated by the light irradiation means with the focus position of the light irradiation means being thereon, its output caused by the returned light from the first optical information medium layer is approximately equal to that of the second light detecting element.

In the optical information recording/reproducing apparatus, the focus error signal can be generated on the basis of a difference between a sum of the outputs of the first and fourth light detecting elements and a sum of the outputs of the second and third light detecting elements.

Preferably, light receiving areas of the first and second light detecting elements are set to be smaller than the light receiving areas of the third and fourth light detecting elements.

The optical head apparatus of the present invention further comprises:

a light source;

light irradiation means for converging the light from the light source and irradiating the optical disk therewith; driving means for adjusting the focus position of the light irradiation means;

light converging means for extracting a part of the returned light from the optical disk that passes a predetermined spatial region and converging it;

a photodetector for detecting the returned light from the optical disk that is converged by the light converging means; and control means for generating the focus error signal from the outputs of the photodetector and performing feedback control of the driving means using the said focus error signal. In the optical head apparatus, there is provided, as the photodetector, a four-part split photodetector consisting of two detecting elements in the inner locations and two detecting elements in the outer locations, wherein the control means generates the focus error signal by adding the signals of the detecting elements of the photodetector with alternating polarities given to the respective signals in such a way that any adjacent elements have mutually different polarities.

According to the present invention, in the optical disk having multiple optical information medium layers therein, precise control of the focus position can be performed and hence reliability in reading the multilayer optical disk is improved.

Other and further objects, features and advantages of the invention will appear more fully from the following description.

BRIEF DESCRIPTION OF THE DRAWINGS

A preferred form of the present invention illustrated in the accompanying drawings in which.

DESCRIPTION OF THE PREFERRED EMBODIMENTS

Figure 1:
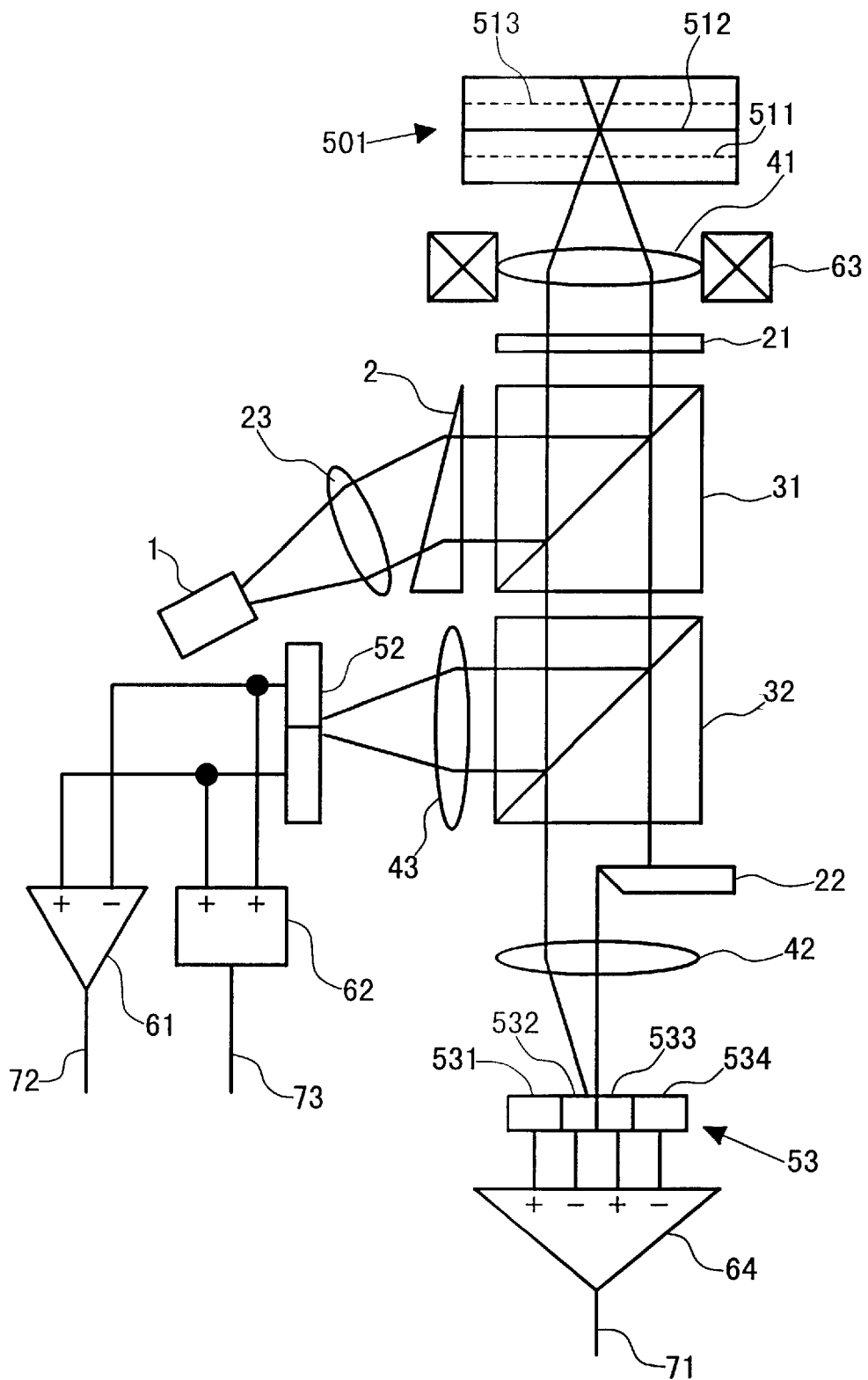
FIG. 1 is a schematic drawing of one example of the optical information recording/reproducing apparatus according to the present invention.

Hereafter preferred embodiments according to the present invention will be described with reference to the drawings. For easy understanding, in the following figures any functional part identical to other part is referenced with the same reference numeral and used for description.

Figure 7:
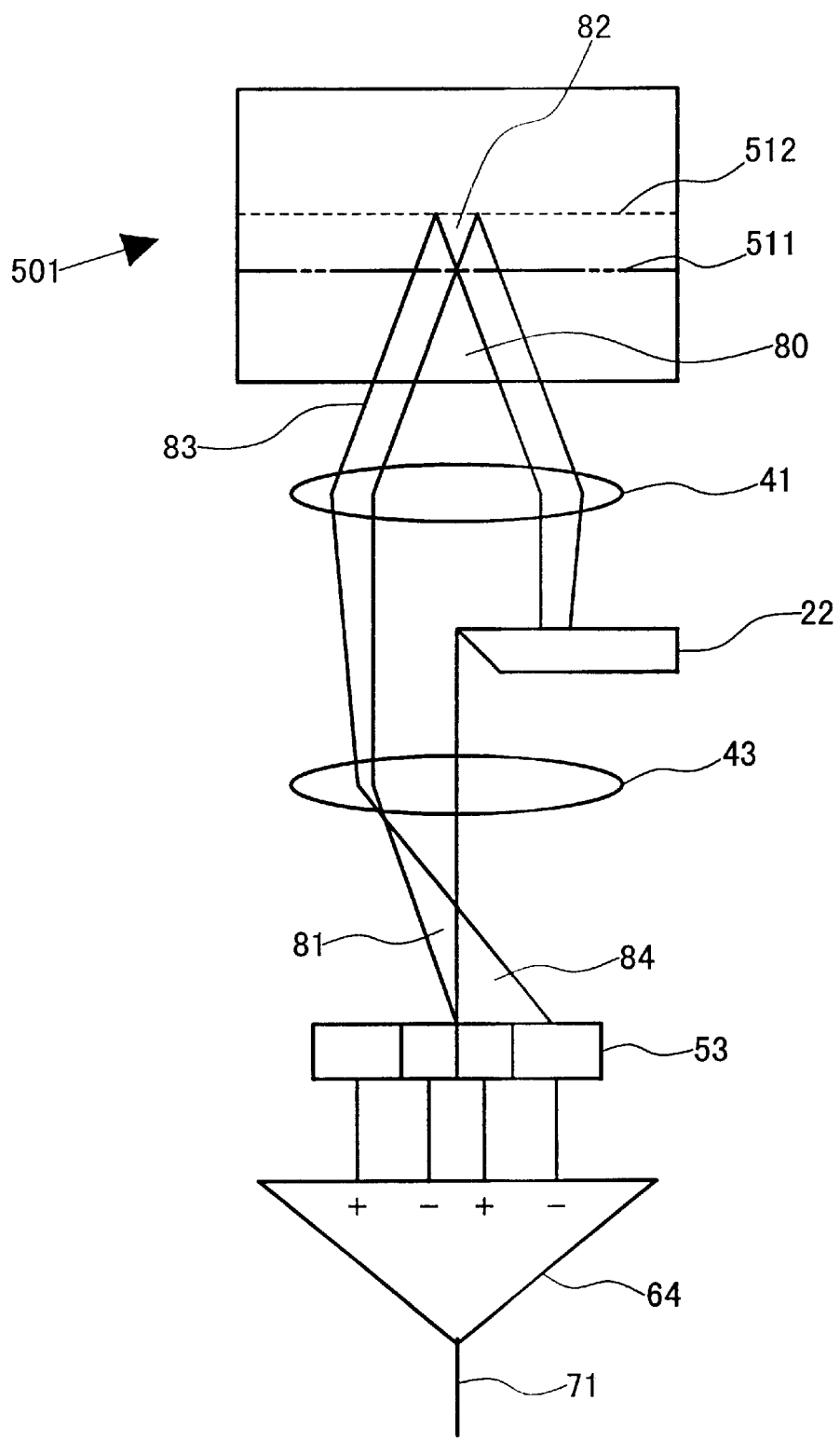
FIG. 7 is a schematic diagram illustrating an effect of the present invention.
Figure 8:
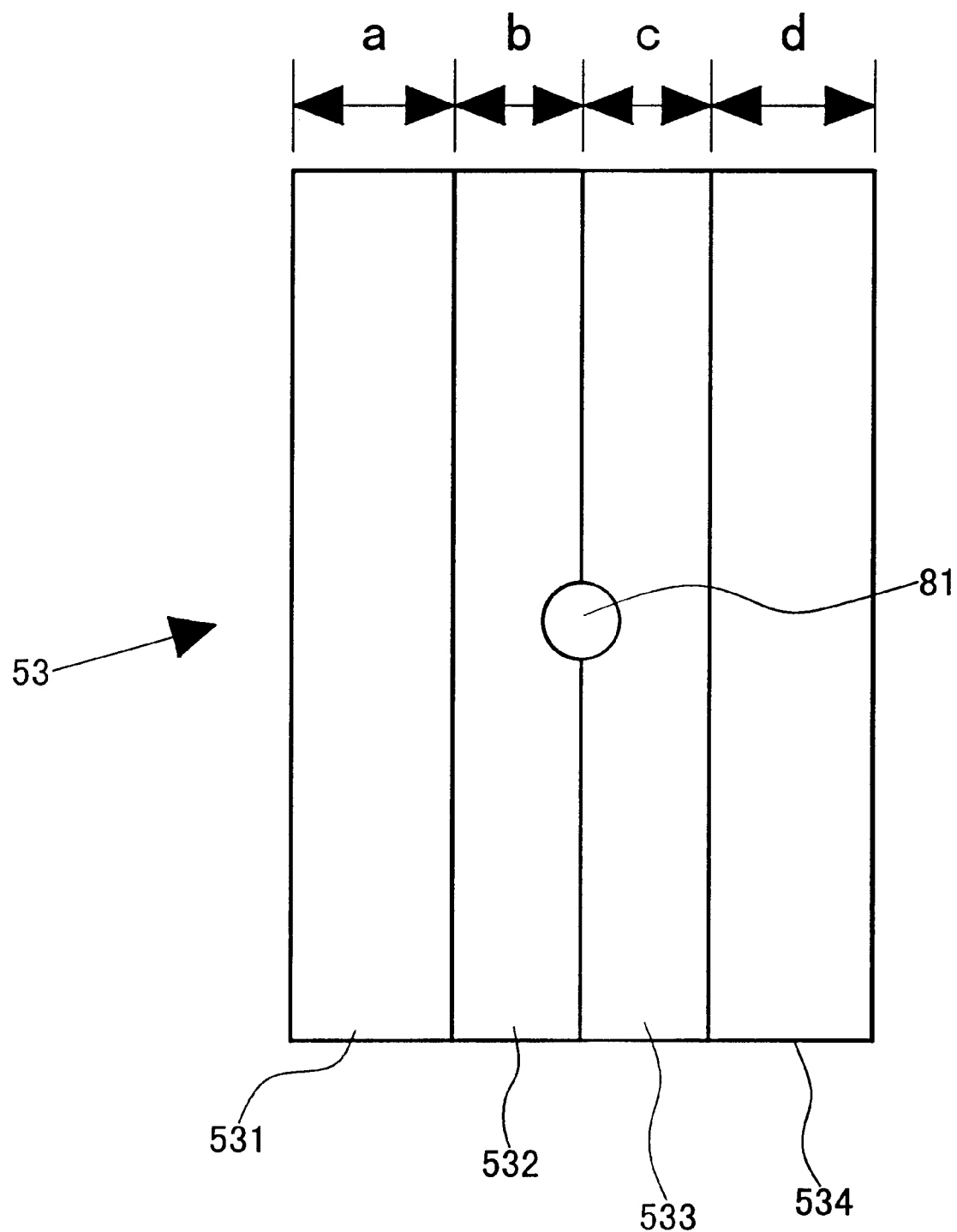
FIG. 8 is a diagrammatic illustration showing an image of the reflected light from the optical information medium layer located at the in-focus position, on a four-part split photodetector.
Figure 9:
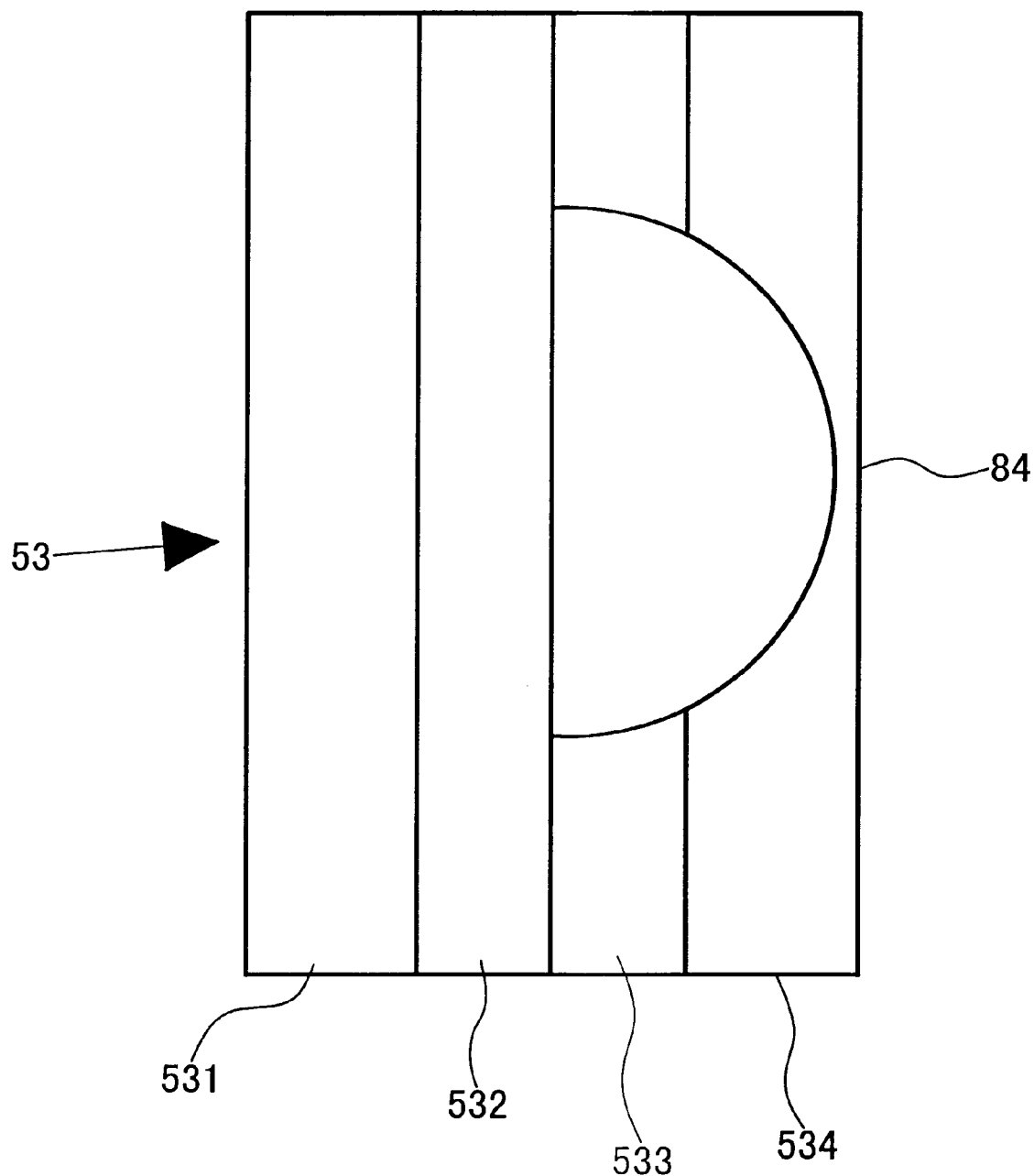
FIG. 9 is a diagrammatic illustration showing an image of the reflected light from the optical information medium layer that is the neighboring layer, on the four-part split photodetector.

First, a principle of the focus position control according to the present invention will be described with reference to FIG. 7, FIG. 8, and FIG. 9. FIG. 7 is a simplified view showing part of the optical system and the detection system necessary to explain the generation of the focus error signal. FIG. 8 is a view showing an image of the reflected light from the first optical information medium layer 511 located at the in-focus position of the objective lens 41 that is formed on a detection plane of a four-part split photodetector 53. Further, FIG. 9 is a view showing an image of the reflected light 84 from the second optical information medium layer 512 adjacent to the first optical information medium layer 511 that is formed on the detection plane of the four-part split photodetector 53.

In FIG. 7, the reflected light from the multilayer optical disk 501 is detected by the four-part split photodetector 53. The multilayer optical disk 501 has the first optical information medium layer 511 and the second optical information medium layer 512 therein. FIG. 7 shows a state where the focus of the objective lens 41 is adjusted to be on the first optical information medium layer 511. The photodetector 53 is the four-part split photodetector, which consists of four light detecting elements 531, 532, 533, 534. The widths of the light detecting elements 531, 532, 533, and 534 in the direction of division are a, b, c, and d, respectively. The reflected light (returned light) from the multilayer optical disk 501 is partly blocked by the knife edge 22, and a remainder of the reflected light that is not blocked by the knife edge 22 is converged by the converging lens 43 and falls on the four-part split photodetector 53. Expressing voltage outputs of the light detecting elements 531, 532, 533, 534 after current-to-voltage conversion in A, B, C, and D, an electronic circuit 64 processes the signals A to D to yield E defined as E=A−B+C−D and generates the outpour 71.

As shown in FIG. 8, the four-part split photodetector 53 is designed such that the reflected light from the first optical information medium layer 511, to which the objective lens 41 is adjusted to be in focus, falls half-and-half on the two light detecting elements 532, 533 in the inner locations thereof. In this occasion, as shown in FIG. 9, the reflected light 84 from the second optical information medium layer 512, which is the neighboring layer of the first optical information medium layer 511, falls on the two light detecting elements 533, 534 located on a first half rectangle of the detection plane of the four-part split photodetector 53, and a split position that sections the light detecting element 533 and the light detecting elements 534 (defining width c and width d) is designed such that the reflected light 84 falls half-and-half on the light detecting element 533 and the light detecting element 534.

Further, consider a case where the focus of the objective lens 41 is adjusted to be on the second optical information medium layer 512, then the reflected light from the first optical information medium layer 511, which is the neighboring layer of the second optical information medium layer 512, falls on the two light detecting elements 531, 532 located on a second half rectangle of the detection plane, opposite to the first half, of the four-part split photodetector 53. A split position that sections the light detecting elements 531, 532 (defining width a and width b) is designed such that the reflected light 84 from the first optical information medium layer 511 falls half-and-half on the light detecting element 531 and the light detecting element 532.

Note that, when the spacing between the optical information medium layers becomes narrow, the light detecting elements 531, 532, 533, 534 need to be designed such that the widths in the direction of division satisfy:

$a>b, d>c, a\approx d,$ and $b\approx c.$

Now, return to the state of FIG. 7 and consider the output 71 of the electronic circuit 64. Since the reflected light from the first optical information medium layer 511, to which the light is in focus, falls on the light detecting element 532 and the light detecting element 533 both located in the inner locations of the photodetector 53, a portion of the output E that is caused by the reflected in-focus light becomes almost zero. Further, since the reflected light 84 from the second optical information medium 512, which is the neighboring layer, falls half-and-half on the light detecting element 533 and the light detecting element 534, a portion of the output E that is caused by the reflected light 84 from the second optical information medium layer 512 becomes almost zero as well. Thus, the output E that is caused by beams of the reflected light from the two layers 511, 512 becomes almost zero when the objective lens 41 is in focus to the first optical information medium layer 511. Similarly, the output E that is caused by the beams of the reflected light from the two layers 511, 512 becomes almost zero when the objective lens 41 is in focus to the second optical information medium layer 512.

Figure 10:
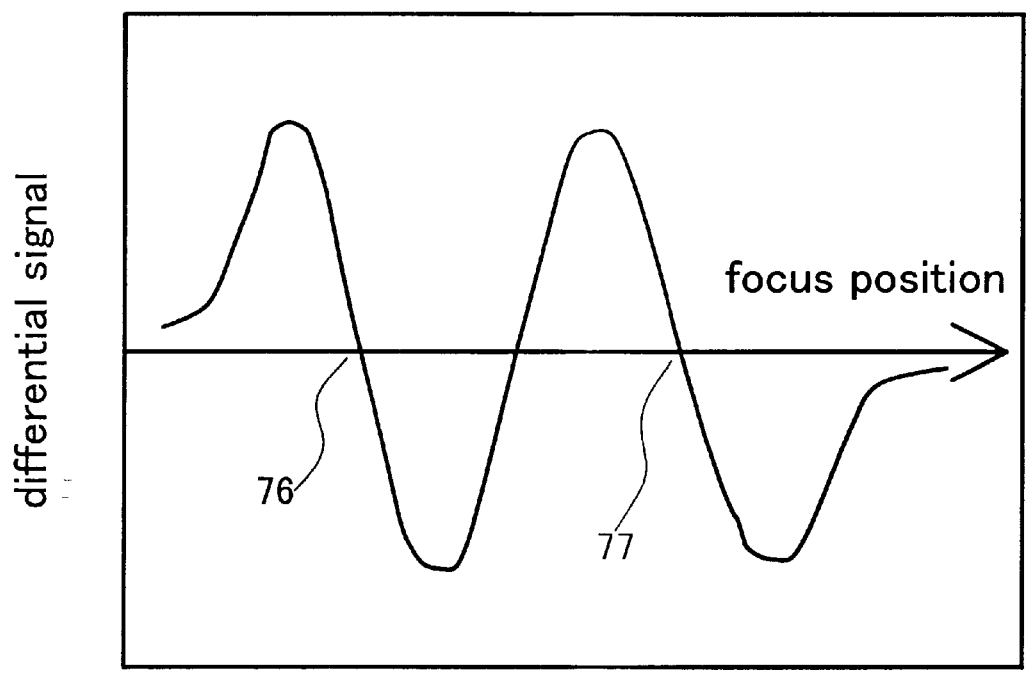
FIG. 10 is a schematic diagram showing variation of the differential signal (focus error) from the four-part split photodetector.

Differential signal 71 obtained when the optical disk 501 is being moved away from the objective lens 41 is shown in FIG. 10. The horizontal axis of FIG. 10 indicates the focus position of the objective lens 41. The conditions at this time are as follows. The size of the light detecting elements 532, 533 is 17.5 μm×75 μm and the size of the light detecting elements 531, 534 is 20 μm×75 μm. Moreover, the wavelength used is 400 nm, the layer spacing is 15 μm, the focal length of the converging lens 43 is 20 mm, and the NA of the objective lens is set to 0.65. Zero cross points 76, 77 of the differential signal 71 as shown in FIG. 10 correspond to states where the second optical information medium layer 512 or the first optical information medium layer 511 agrees with the focus position, respectively.

Up to here, readout of the information from the optical disk that has the two optical information medium layers therein is described, but the present invention can also be applied to a case where the optical disk further comprises a third optical information medium layer. For example, in the case where the third optical information medium layer exists at a location nearer the objective lens 41 than the first optical information medium layer, the reflected light from the third optical information medium layer is focused at a position farther than the focus position of the converging lens 43 and hence falls on the light detecting element 531 and the light detecting element 532 of FIG. 8. An output signal of this reflected light can be virtually reduced to zero, in a similar manner to the reflected light from the second optical information medium layer, that is, by detecting the reflected light with the light detecting elements 531, 532 that were formed by division and subtracting the output signals of the both detecting elements. As a result, the effect of the reflected light from the third optical information medium layer that is the neighboring layer can be reduced.

FIG. 1 is a schematic diagram of a light irradiation part and a light detection part of one example of the optical information recording/reproducing apparatus according to the present invention.

Figure 2:
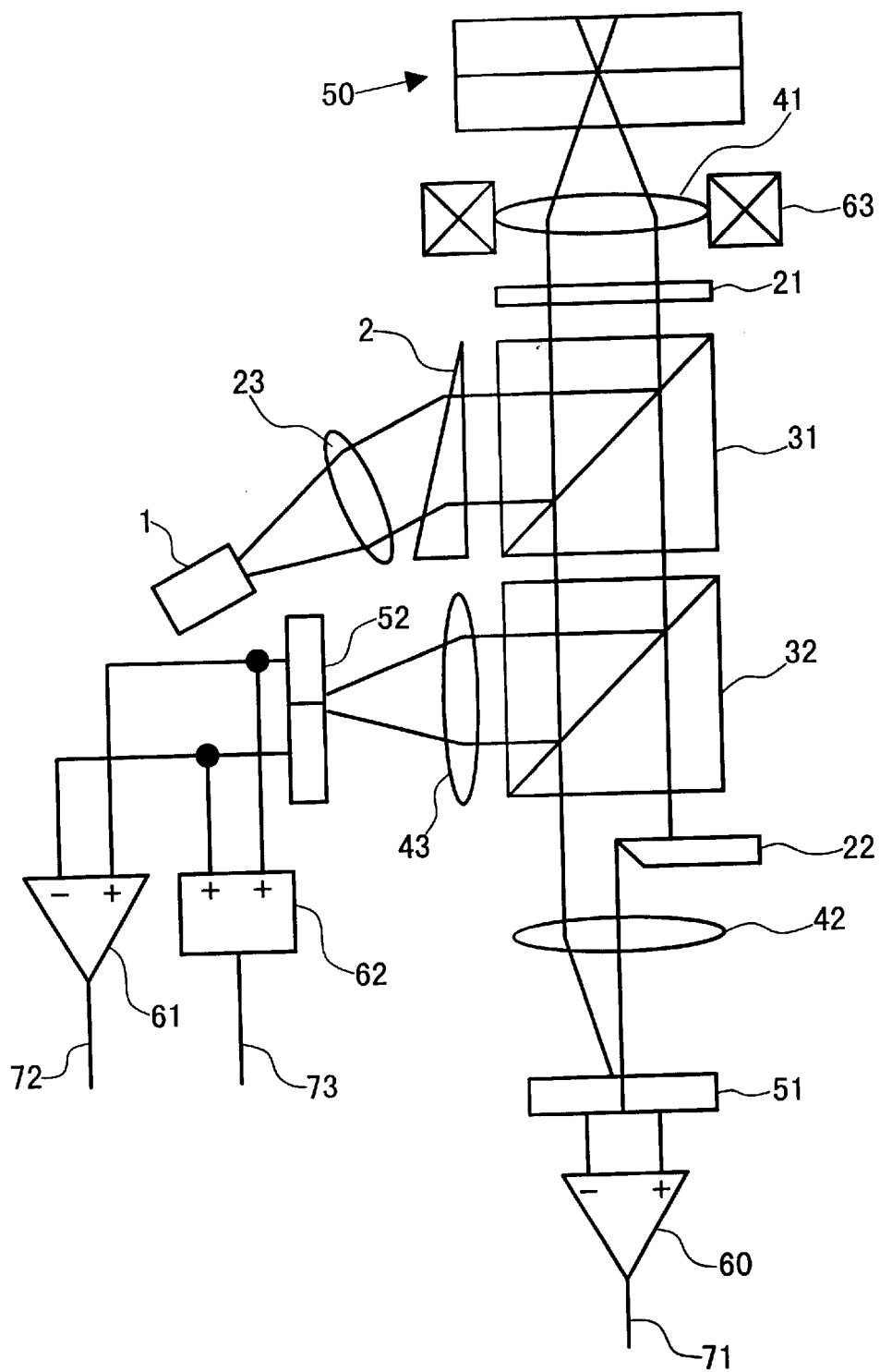
FIG. 2 is a schematic diagram of the conventional optical information recording/reproducing apparatus.
Figure 3:
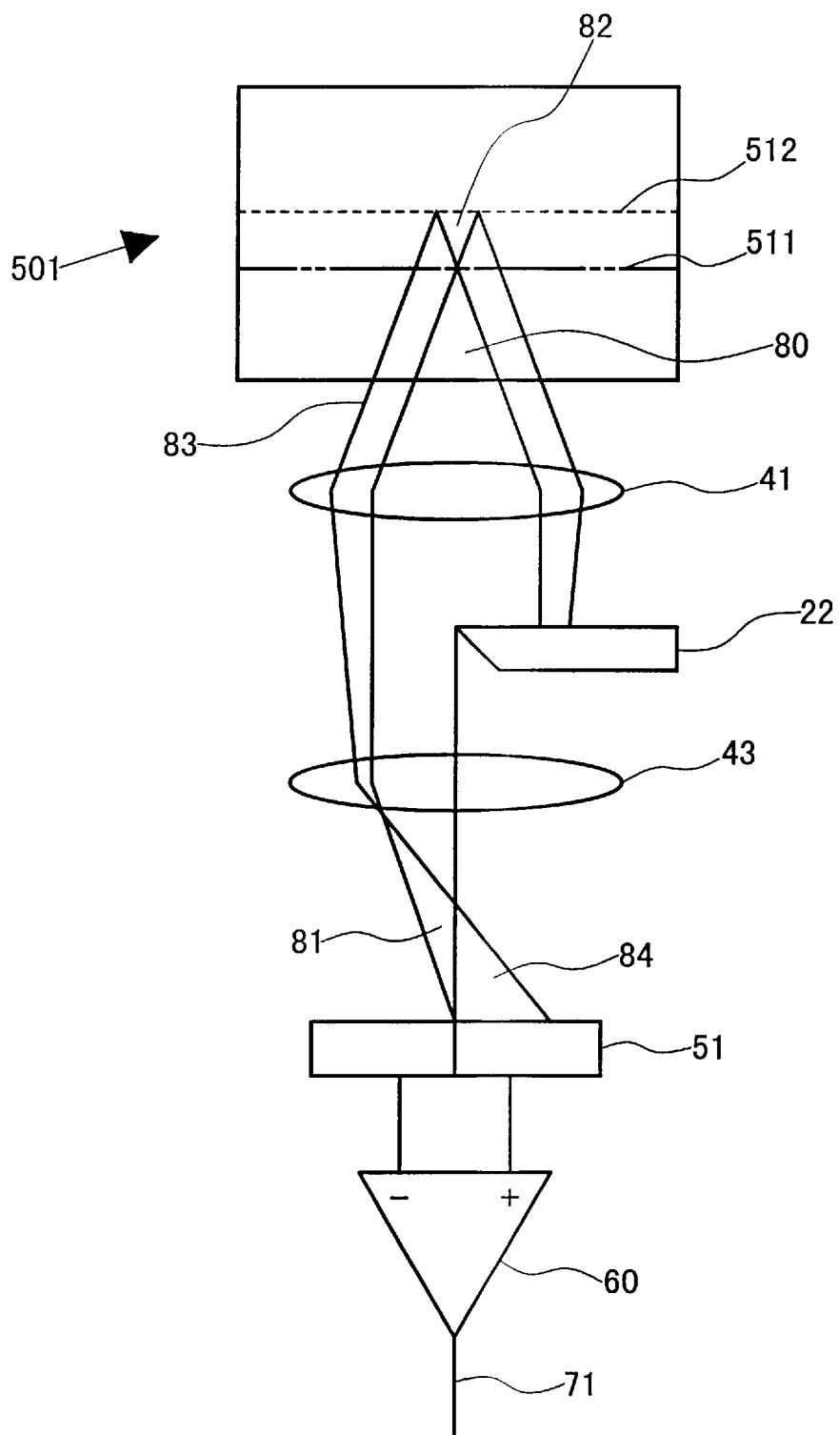
FIG. 3 is a schematic diagram illustrating the problem of the focus error signal generated from the multilayer disk.
Figure 4:
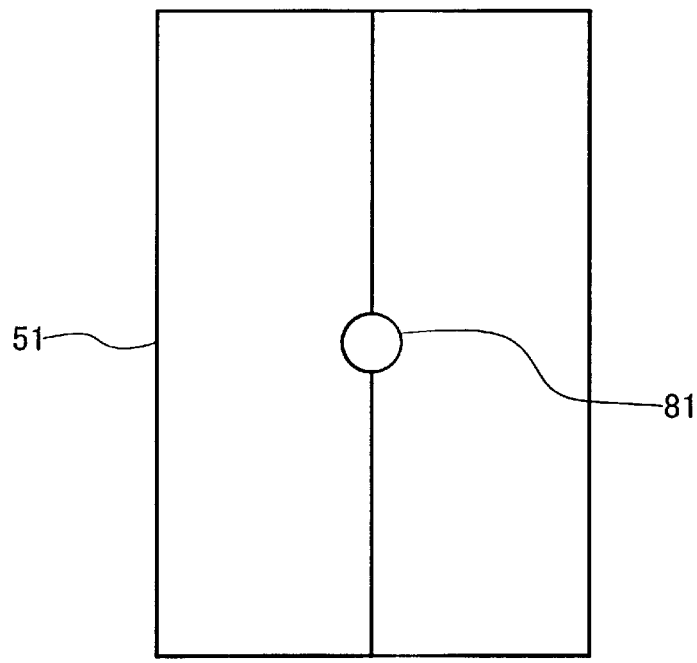
FIG. 4 is a diagrammatic illustration showing an image of the reflected light from the optical information medium layer located at an in-focus position, on the photodetector.
Figure 5:
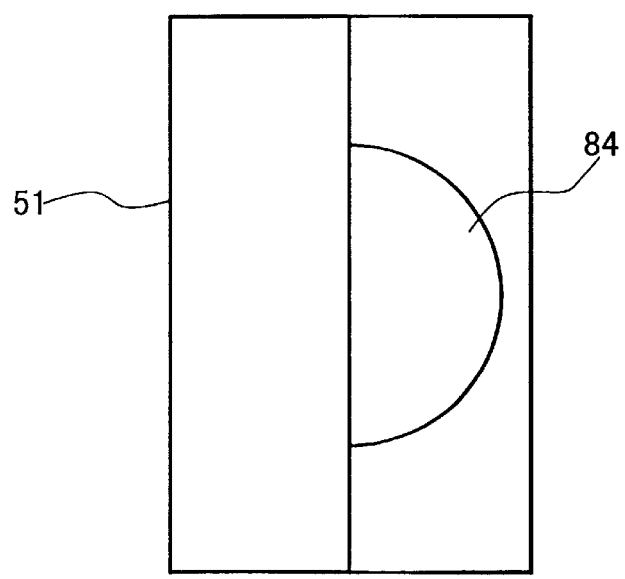
FIG. 5 is a diagrammatic illustration showing an image of the reflected light from the optical information medium layer that is the neighboring layer, on the photodetector.
Figure 6:
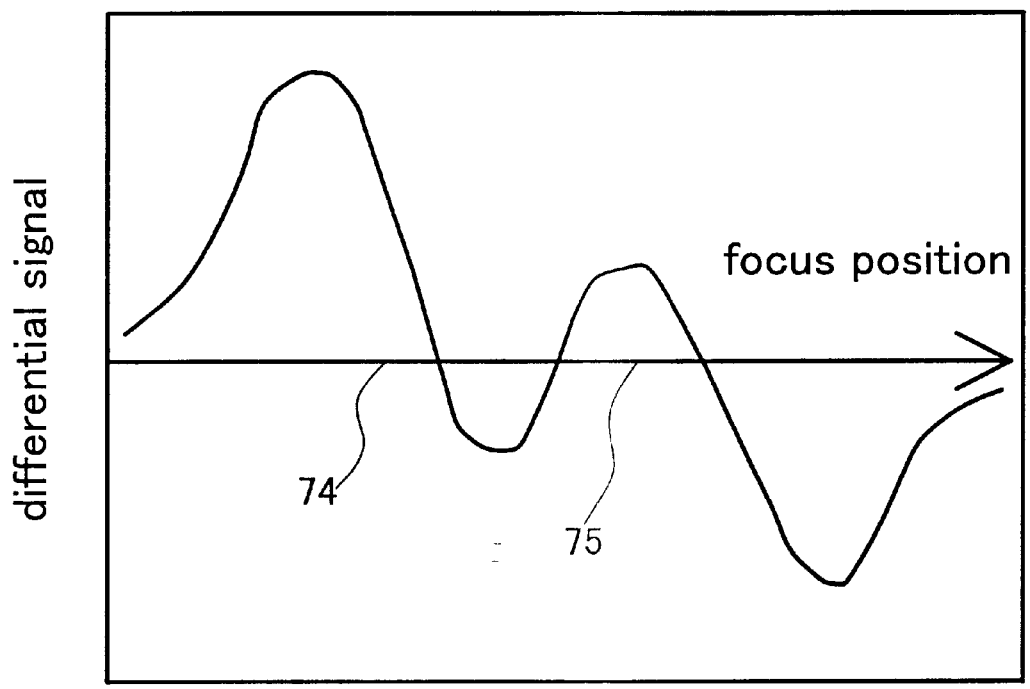
FIG. 6 is a schematic diagram showing variation of the differential signal (focus error) from the split photodetector.

Laser light emitted from the semiconductor laser 1 is converted to a collimated beam by a collimator 23 and further converted to a circular beam by a prism 2. This laser light is reflected by a polarizing beam splitter 31, is converted to circularly-polarized light by a quarter-wave plate 21, and then focused down to a minute spot by the objective lens 41. At the focus position of the spot, as a multilayer optical disk 501 is rotating, reflected light whose intensity is varying is generated from the optical information medium layers 511, 512, 513, etc. bearing the recording marks. The reflected light returns to the objective lens 41, is converted to linearly-polarized light by the quarter-wave plate 21, and is transmitted though the polarizing prism 31. The transmitted light is divided into two parts by a beam splitter 32. Reflected light from the beam splitter 32 passes through a converging lens 43 and is used to generate the tracking error signal and a data signal as shown in the conventional example of FIG. 2. Transmitted light from the beam splitter 32 is blocked partly by the knife edge 22, is converged by the converging lens 42, and is allowed to irradiate the four-part split photodetector 53. The signals from the light detecting elements of the photodetector are processed to form a differential signal in the electronic circuit 64 and it is used as the focus error signal 71.

The four-part split photodetector 53 outputs the focus error signal 71 based on the principle explained with reference to FIG. 8 and FIG. 9. That is, the four light detecting elements 531, 532, 533, 534 of the four-part split photodetector 53 are designed to fulfil the following conditions:

(1) When the objective lens 41 is in a state of in focus to one of the optical information medium layers of the multilayer optical disk 501, the voltage outputs B, C of the two light detecting elements 532, 533 located in the inner locations caused by detecting the reflected light from the other one of the optical information medium layers are equal;

(2) designating the direction of division along which the four-part split photodetector is divided as, e.g., a right-and-left direction, the photodetector is considered to be consisting of two sets of the light detecting elements, namely, two light detecting elements on the right side and two elements on the left side, and when the objective lens 41 is in the state of in focus to the optical information medium layer 511, the voltage outputs A, B of the light detecting elements 531, 532 caused by the reflected light from the optical information medium layer 512 adjacent to the optical information medium layer 511 (to which the light is adjusted to be in focus) are equal;

(3) similarly (as in the above situation), when the objective lens 41 is in the state of in focus to the other one of the optical information medium layers 512, the voltage outputs C, D of the light detecting elements 533, 534 caused by the reflected light from the optical information medium layer 511 adjacent to the optical information medium layer 512 (to which the light is adjusted to be in focus) are equal. This requirements can be achieved, for example, by arranging four light detecting elements 531, 532, 533, 534 of the four-part split photodetector 53 such that the lengths of sides of the two light detecting elements in the direction of division that are located in the inner locations are shorter that the lengths of sides of the two light detecting elements 532, 533 in the direction of division that are located in the outer locations. Then, the outputs A, B, C, D of the four light detecting elements 531, 532, 533, 534 of the four-part split photodetector 53 undergo signal processing in the electronic circuit 64 to yield the output 71 formulated as (A−B+C−D), which is then used as the focus error signal to control the lens actuator of the objective lens 41. By these operations, focusing of the light on a desired optical information medium layer can be performed without being affected by the reflected light from the neighboring optical information medium layer.

Figure 11:
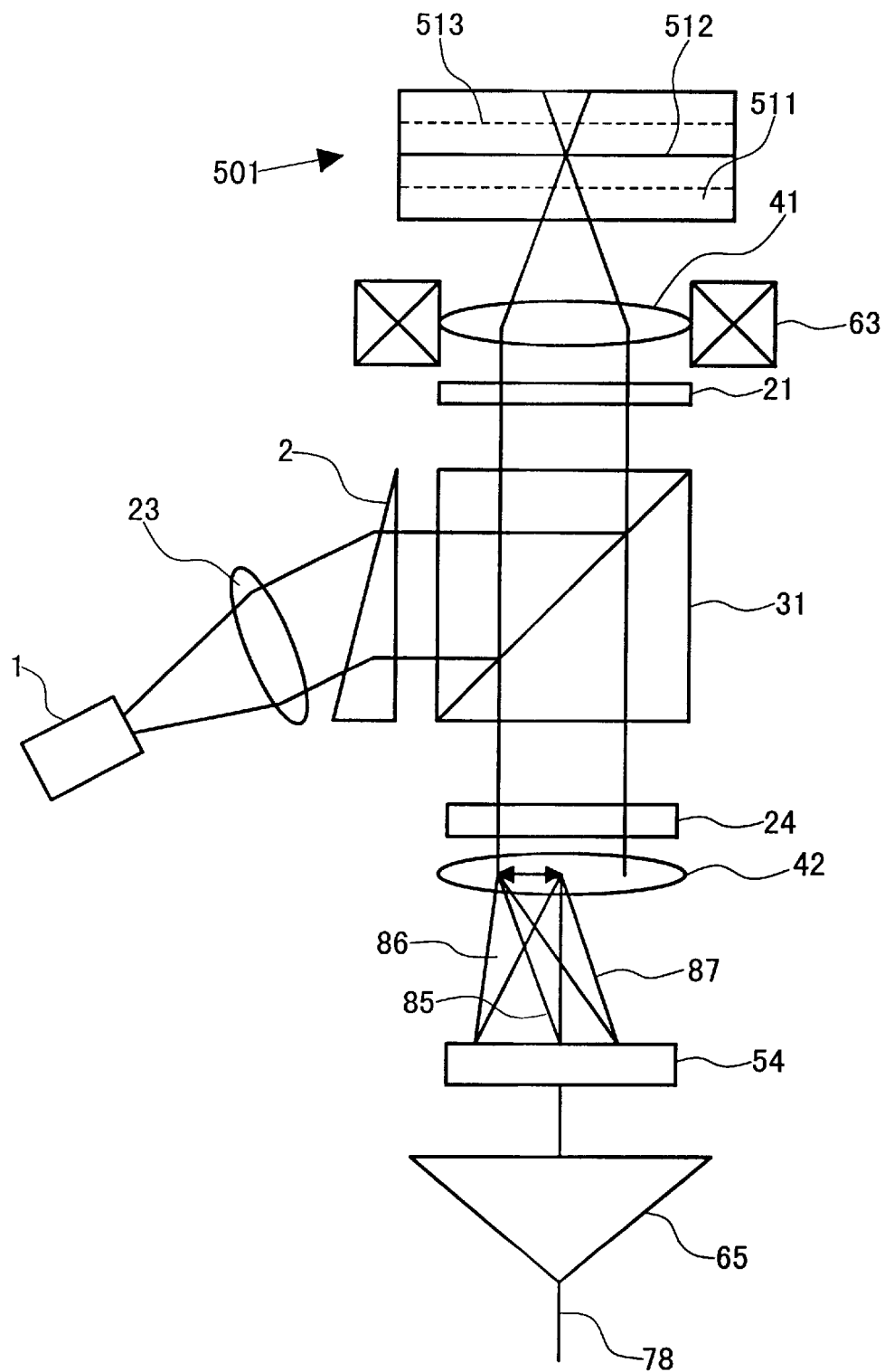
FIG. 11 is a schematic diagram of a further example of the optical information recording/reproducing apparatus according to the present invention.

FIG. 11 is a schematic diagram of a further example of the optical information recording/reproducing apparatus according to the present invention. This optical information recording/reproducing apparatus depicted in FIG. 11 gives an outline of an optical information recording/reproducing apparatus that uses a hologram optical element.

Figure 12:
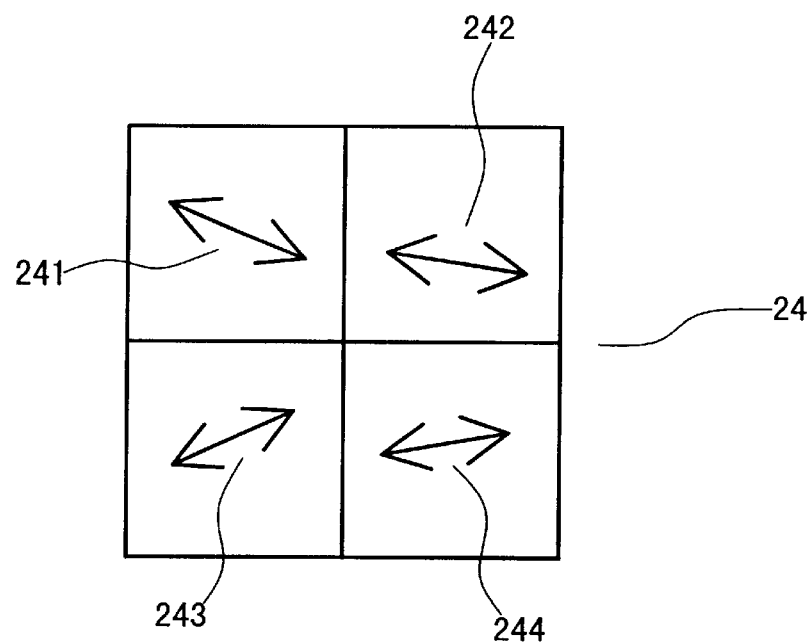
FIG. 12 is a view showing diffraction directions of light (a projection onto a plane normal to the optical axis) by a hologram optical element that were divided into four parts.

As an optical system for irradiating the optical disk 501 with the laser light from the semiconductor laser diode 1 and an optical system for extracting the reflected light are the same as those of the apparatus example shown in FIG. 1, detailed explanation is omitted. Reflected light from the optical disk 501 is diffracted by a hologram optical element 24. A configuration of the hologram optical element 24 is one that is divided into four parts, whose diffraction directions (241, 242, 243, 244) are different to one another, as shown in FIG. 12. Regarding indication of diffracted light in FIG. 11, only diffracted light from one diffraction grating is illustrated and beams of diffracted light from three other diffraction gratings are omitted from the illustration. After passing through a region in the converging lens 42 that is roughly indicated by the arrow in the figure, the diffracted light is converged onto different positions on a photodetector 54 as the zeroth-order diffracted light 85, (−)first-order diffracted light 86, and (+)first-order diffracted light 87.

Figure 13:
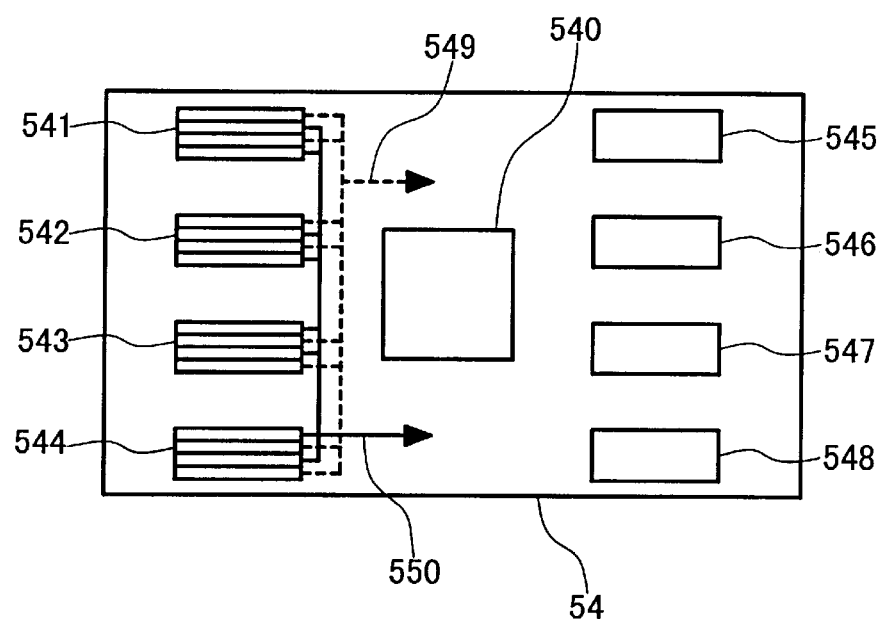
FIG. 13 is a schematic diagram showing a pattern of the photodetector.

A configuration of the light receiving regions of the photodetector 54 is shown in FIG. 13. Four-part split photodetectors 541–544 are for generating the focus error signal and each was divided into four parts as described above. The four-part split photodetector 541 detects the (−) first order diffracted light that is diffracted in a diffraction direction 241 of FIG. 12; The four-part split photodetector 542 detects the (−) first order diffracted light that is diffracted in a diffraction direction 242; The four-part split photodetector 543 detects the (−) first order diffracted light that is diffracted in a diffraction direction 244; and The four-part split photodetector 544 detects the (−) first order diffracted light that is diffracted in a diffraction direction 243. All of the light detecting elements of the four-part split photodetectors 541–544 are connected with wires 549 and 550. By this wiring, photocurrent of the light detecting elements that correspond to either one or the other group are added up to form two signals 549, 550, one signal being for the one group and the other signal being for the other group. A differential signal of the two signals 549, 550 is obtained through processing in an electronic circuit 65 and acts as a focus error signal 78.

Photodetectors 545–548 are for generating the tracking error signal. The photodetector 545 detects the (+) first order diffracted light that is diffracted in a diffraction direction 243 of FIG. 12; The photodetector 546 detects the (+) first order diffracted light that is diffracted in a diffraction direction 244; The photodetector 547 detects the (+) first order diffracted light that is diffracted in a diffraction direction 242; and The photodetector 548 detects the (+) first order diffracted light that is diffracted in a diffraction direction 241. The tracking error signal to be obtained with these signals from these photodetectors is generated by the differential phase method or by the push-pull method.

The focus error signal and the tracking error signal make it possible to perform servo control on the lens actuator 63 in FIG. 11 to control the position of the objective lens 41 with the result that the focus is kept at an optimal position. Lastly, the zeroth-order diffracted light falls on a photodetector 540 and a signal of this light is put through an equalizer, a shaping circuit, a comparator, a decoder, etc. to become a regenerated signal.

According to a concept of the optical information recording/reproducing apparatus shown in FIG. 11, as the hologram optical element is used, the number of optical components can be reduced and miniaturization of the optical head can be realized.

Figure 14:
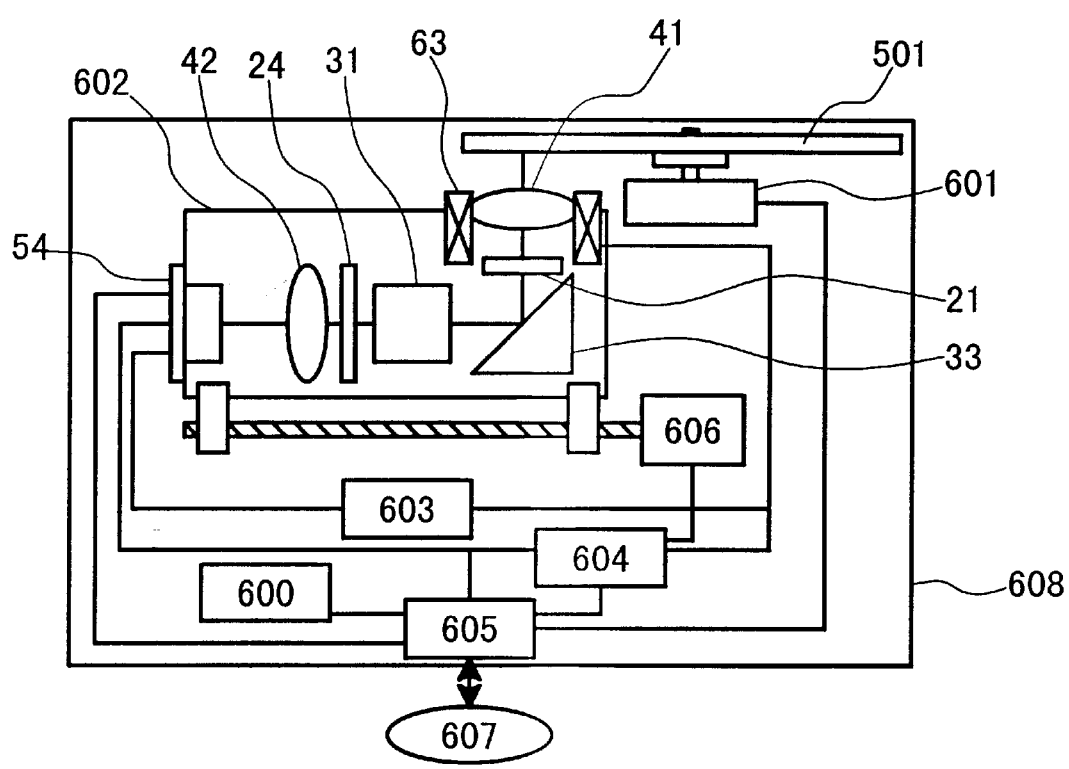
FIG. 14 is a schematic diagram showing a concrete example of the optical disk drive of the optical information recording/reproducing apparatus.

FIG. 14 is a schematic drawing showing an concrete example of the optical disk drive of an optical information recording/reproducing apparatus 608 that is constructed by installing the optical system shown in FIG. 11.

A laser light source (not shown explicitly in the figure) is driven by a laser driving circuit 600, light therefrom is introduced to the optical system through a polarizing beam splitter 31, and an optical path of the light is bent by a prism mirror 33 at right angles so as to travel in a direction normal to the optical disk 501. Subsequently, the light is put through the quarter-wave plate 21 and the objective lens 41 to reach the optical disk 501. The optical disk 501 is rotated by a spindle motor 601, and an irradiation position of the light thereon changes with time. Reflected light from the optical disk 501, after passing through the hologram optical element 24, irradiates the light receiving areas of the photodetector 54 through the converging lens 42. The optical head 602 comprises at least the semiconductor laser 1, the polarizing beam splitter 31, the hologram optical element 24, the quarter-wave plate 21, the photodetector 54, the converging lens 42, the prism mirror 33, the objective lens 41, and the lens actuator 63.

The signals from the wires 549,550 are processed in a focus detection circuit 603 to give the focus error signal. This signal is fed back to the lens actuator 63, which performs focus control.

Further, the optical signals from the photodetectors 545, 546, 547, 548 are converted to the tracking signal by the tracking circuit 604. The tracking signal is fed back to the lens actuator 63 and used as a driving signal of the disk for the radial direction. Moreover, according to a readout address instruction from the controller circuit 605 and the tracking error signal, the tracking circuit 604 positions the optical head 602 at a proper radial position of the disk by driving a feed motor 606. A signal from the photodetector 540 is converted to a regenerative signal by the controller circuit 605 and outputted as user data 607.

An operation of the recording is performed as follows. The user data 607 is inputted to the controller circuit 605, and according to the data 607 the controller circuit 605 controls the laser driving circuit 600 to control lasing of a semiconductor laser chip, and thereby records the information in the optical disk 501.

Information is recorded with a recording laser light that is varied so as to be held either at an intermediate power level Pe (3 mW) or at a high power level Ph (7 mW) while the optical head is under control of tracking and auto-focusing to a recording region of the optical information medium layer of the optical disk 501. A linear velocity of the recording track is 9 m/s, the wavelength of the semiconductor laser is 405 nm, and the NA of the lens is 0.65. A noncrystalline part or a part close to a noncrystalline state that is formed on the recording region by the recording laser light serves as a recorded spot. Regarding the optical information medium layer of this optical disk, the reflectivity is high when the medium layer is in the crystalline state whereas the reflectivity is low when the medium layer undergoes recording and comes to the non-crystalline state.

Preferably a ratio of the high power level of the recording laser light to the intermediate power level is in a range from 1:0.3 to 1:0.7. Alternatively, the laser light may be modulated to one or more power levels other than the power levels each being in a short time. When the recording/reproducing is performed using an apparatus equipped with means for creating a waveform that, for a latter half period (Tw/2) of each window during formation of one recording mark, causes the power level to decrease to a bottom power level Pb which is lower than the intermediate power level repeatedly and also to maintain a cooling power level Pc for a while at the end of the recording pulse, a jitter value and an error rate of the reproduced signal waveform is found to be reduced. Here, the cooling power level Pc is lower than the intermediate power level Pe and higher than the bottom power level Pb. This waveform has a feature that a first pulse width Tp varies depending on a combination of the lengths of the recording mark and of a space provided just before the mark, and also a feature that a cooing pulse width Tc (a duration in which the light power level is reduced to the Pc level just after the recording pulse) is determined by a combination of the lengths of the recording mark and of a space following the mark. The shorter the space length just before the mark and the longer the mark, the shorter the Tp becomes; the longer the space length just before the mark and the shorter the mark, the longer the Tp becomes. However, depending on the structure of the medium, when the Tp of a recording waveform for recording a 6Tw mark is lengthened especially, an effect of reducing the jitter is large. Moreover, the longer the space length following the mark and the longer the mark, the shorter the Tc becomes; the shorter the space length following the mark and the shorter the mark, the longer the Tc becomes.

Figure 15:
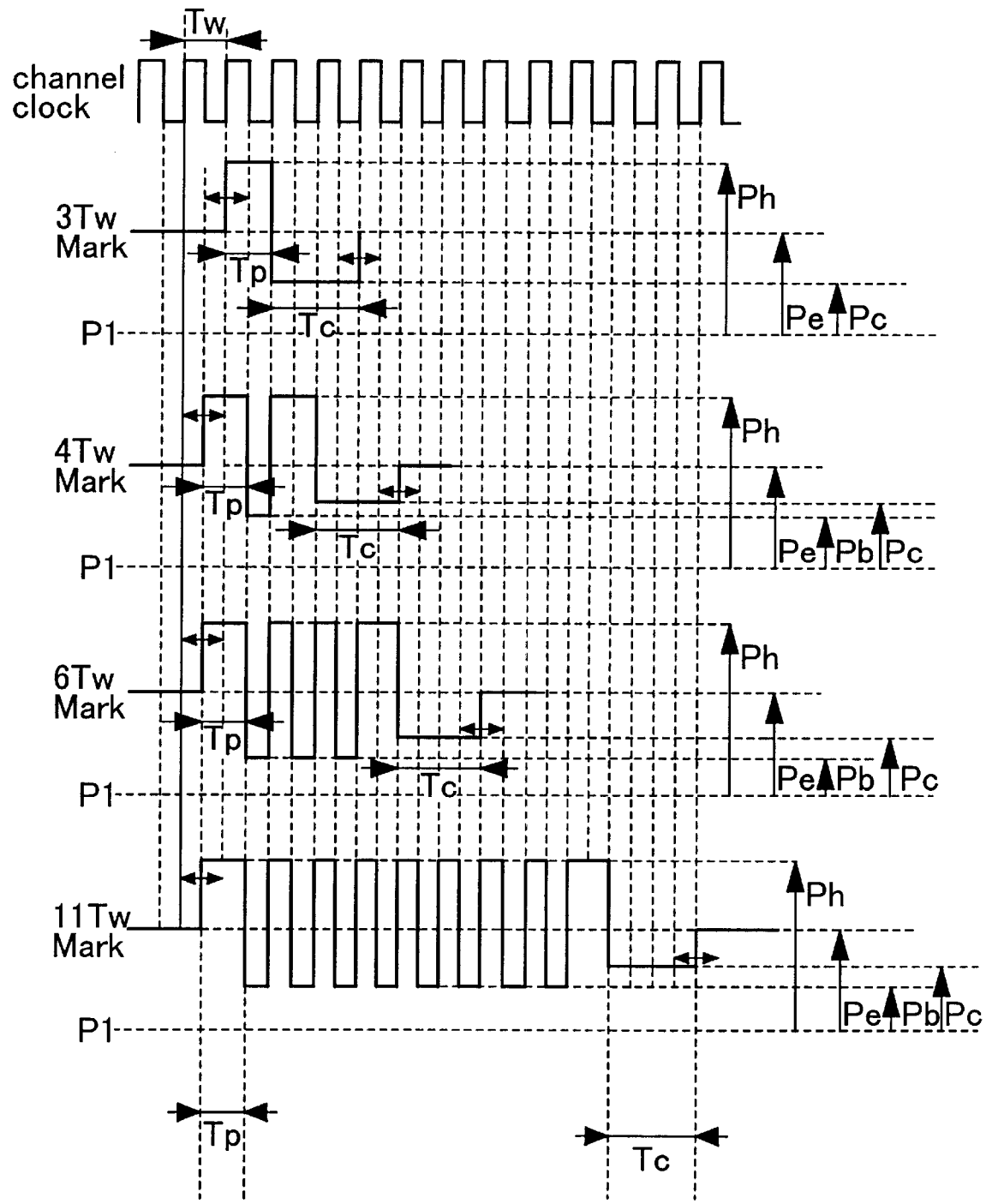
FIG. 15 is a schematic diagram showing an example of the recording waveform.

FIG. 15 shows only recording waveforms for 3Tw, 4Tw, 6Tw, and 11Tw marks. The recording waveform for a 5Tw mark is such that the high power level with a Tw/2 period and the following bottom power level Pb with a Tw/2 period are removed from a series of the high power pulses and the low power pulses that constitute the recording waveform for a 6Tw mark. Further, record waveforms for 7Tw to 10Tw marks are such that a necessary number of pairs each consisting of the high power level Ph with a Tw/2 period and the bottom power level Pb with a Tw/2 period is/are added to the recording waveform for a 6Tw mark at a position just before the high power level pulse located at its end. Therefore, the recording waveform for an 11Tw mark is a combination of the waveform for a 6Tw mark and five additional pairs.

Here, the shortest recording mark length corresponding to 3Tw is chosen to be 0.26 μm. The power level of the laser light is specified in such a way that, when the beams passes by a point where the recording is to be performed, the power level is reduced to a low power level Pr (1 mW) of the reproducing (reading out) laser light. In such a recording method, if new information is recorded by overwriting without erasing regions where information has already been recorded, that portion is rewritten with new information. That is, it is possible that a single light spot almost circular in cross section can be used to perform overwriting.

However, the following method may be taken instead: (1) in the first single rotation or several rotations of the disk during rewriting, continues wave light with a power equal or close to the intermediate power level (3 mW) of the writing laser light that is power modulated as described above is irradiated onto the disk to erase temporarily information having been recorded; and (2) in the next one rotation, laser light whose power is modulated according to information signals so as to hold at either the bottom power level (0.5 mW) or the high power level (7 mW), or at either the intermediate power level (3 mW) or the high power level (7 mW) is irradiated to perform the recording. If the information is erased and then new information is recorded in this way, information that has been recorded and remains un-erased even after recording becomes small in amount. Therefore, this scheme also facilitates rewriting with a doubled linear velocity.

As described in the foregoing, according to the present invention, when the focus error signal is generated for the multilayer optical disk as a target disk, the effect of the reflected light from the neighboring layer(s) can be reduced and thereby the reliability in reading the information can be improved. Seeing the things from the other side, the layer spacing of the optical information medium layers can be narrowed thanks to this effect. Normally, if the layer spacing of the optical information medium layers is enlarged, the cross talk can be reduced, but it becomes difficult to achieve a multilayer configuration in the disk that has a limited thickness. In this trade-off, the present invention can minimize the effect from the other neighboring layer(s), there can be devised an optical disk drive capable of reading the multilayer optical disk having more than one layers therein with a narrower layer spacing.

The foregoing invention has been described in terms of preferred embodiments. However, those skilled, in the art will recognize that many variations of such embodiments exist. Such variations are intended to be within the scope of the present invention and the appended claims.

What is claimed is:

1. A light information reproducing apparatus for reproducing information from an optical disk having a first optical information medium layer and a second optical information medium layer therein, comprising:

a light source;

light irradiation means for converging a light from said light source and irradiating said optical disk therewith;

light extracting means for extracting a part of a returned light from either of said first or second optical information medium layer of said optical disk that passes a predetermined spatial region therein;

a four-element photodetector including first and second light detecting elements placed between third and fourth light detecting elements for detecting the part of the returned light that is extracted by said light extracting means, wherein said first and second light detecting elements are arranged such that, when one of said first and second optical information medium layers is irradiated by said light irradiation means being in focus thereon, outputs of said first and second light detecting elements caused by detecting the part of the returned light from the other one of said first and second optical information medium layers are approximately equal, said third light detecting element which is located next to said first light detecting element such that, when said first optical information medium layer is irradiated by said light irradiation means being in focus thereon, outputs of said first and third light detecting elements caused by detecting the part of the returned light from said second optical information medium layer is approximately equal, and said fourth light detecting element which is located next to said second light detecting element such that, when said second optical information medium layer of said optical disk is irradiated by said light irradiation means being in focus thereon, outputs of said second and fourth light detecting elements caused by detecting the part of the returned light from said first optical information medium layer is approximately equal; and focus error signal generating means for generating a focus error signal by taking a difference between a sum of the outputs of said first and fourth light detecting elements and a sum of the outputs of said second and third detecting elements.

2. An optical information reproducing apparatus according to claim 1, wherein light-receiving areas of said first and second light detecting elements are smaller than light-receiving areas of said third and fourth light detecting elements.

* * * * *